(12) United States Patent
Kawamura et al.

(10) Patent No.: US 6,621,186 B2
(45) Date of Patent: Sep. 16, 2003

(54) ALTERNATOR FOR VEHICLES

(75) Inventors: Keizou Kawamura, Kasumigaura (JP);
Hideaki Mori, Chiyoda (JP); Susumu Sasaki, Naka (JP); Susumu Tajima, Hitachinaka (JP); Masami Takano, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/950,795

(22) Filed: Sep. 13, 2001

(65) Prior Publication Data
US 2002/0047343 A1 Apr. 25, 2002

(30) Foreign Application Priority Data
Sep. 18, 2000 (JP) ........................................ 2000-286857

(51) Int. Cl.[7] ................................................. H02K 9/00
(52) U.S. Cl. .................................................... 310/60 R
(58) Field of Search ..................................... 310/52–65

(56) References Cited

U.S. PATENT DOCUMENTS

| | | | | |
|---|---|---|---|---|
| 4,239,999 A | * | 12/1980 | Vinokurov et al. ............ | 310/52 |
| 5,717,262 A | * | 2/1998 | Muller et al. .................. | 310/58 |
| 5,744,880 A | * | 4/1998 | Kudoh et al. .................. | 310/58 |
| 6,172,433 B1 | * | 1/2001 | Asao ............................. | 310/62 |
| 6,297,571 B1 | * | 10/2001 | Knappenberger ......... | 310/60 R |

FOREIGN PATENT DOCUMENTS

| | | | | |
|---|---|---|---|---|
| DE | 19802303 C1 | * | 7/1999 | ............ H02K/9/08 |
| EP | 0 649 211 A2 | | 4/1995 | |
| EP | 0 771 060 A1 | | 5/1997 | |
| EP | 1 130 545 A1 | | 3/2000 | |
| JP | 01064538 A | * | 3/1989 | ............ H02K/9/06 |
| JP | 11243658 A | * | 9/1999 | ............ H02K/9/19 |
| JP | 2000092786 A | * | 3/2000 | ............ H02K/9/04 |

OTHER PUBLICATIONS

Patent Abstracts of Japan 2000083350, published Mar. 21, 2000.
Patent Abstracts of Japan 11243658, published Sep. 9, 1999.
Patent Abstracts of Japan 20000116062, published Apr. 21, 2000.

* cited by examiner

Primary Examiner—Nestor Ramirez
Assistant Examiner—Guillermo Perez
(74) Attorney, Agent, or Firm—Antonelli, Terry, Stout & Kraus, LLP

(57) ABSTRACT

An alternator for vehicles, provided with a stator, a rotor, a rectifier and a voltage regulator, and comprising turbulent flow generating members 22 provided on heat transfer surfaces, through which heat generated from a field coil is transferred to a side of a bracket from a rotor, to generate convection of an air and turbulence of flow on downstream regions of recesses and projections, whereby a heat transfer performance from the rotor to the bracket is enhanced with a rotational frequency of the rotor.

2 Claims, 8 Drawing Sheets

ALTERNATOR FOR VEHICLES

BACKGROUND OF THE INVENTION

The present invention relates to an alternator for vehicles, and more particularly to an alternator for vehicles, provided with a voltage regulator suitable as a generator for automobiles.

The following has been demanded of conventional alternators for vehicles. First, in order to cope with an increase in electric load on a vehicle, high output and miniaturization have been demanded of alternators for vehicles. Second, reduction in noise has been demanded of alternators for vehicles.

While a field coil, a stator, a voltage regulator and a rectifier involve generation of heat during operation, each of them has to be kept at or below a certain temperature in order to preserve its capacity. Most alternators for vehicles, according to the prior art, are of air cooling type, in which a cooling air is used to cool respective parts thereof. When alternators for vehicles are adapted for high output, amounts of heat generated in a stator, a voltage regulator, a rectifier and so forth will increase. Also, with further miniaturization, a heat radiating area decreases and hence respective parts become liable to rise in temperature. Therefore, there is caused the need of enhancing the cooling performance for respective parts in an alternator.

Conceivable ways to enhance the cooling performance include an increase in flow rate of a cooling air since air flows are presently used for that purpose. Thus, a large-sized fan or a plurality of fans for synchronization with a rotor are mounted to generate flows of cooling air for cooling a field coil, a stator, a voltage regulator, a rectifier and so forth. Apart from that, there is a way to use a coolant to enhance the cooling performance of an alternator for vehicles. The use of a coolant eliminates the necessity of a fan or fans used in an air cooling system, and is greatly effective in reduction of noise.

There is a way to use as one of such coolants a cooling water for an engine. A prior water cooling system for alternators for vehicles is disclosed in Japanese Patent Unexamined Publication No. 11-243658. In this prior system, a plurality of rings (hereinafter, referred to as rotary disks) are provided on both axial sides of a rotor to have a certain height and be concentric with an axis of a rotating shaft. A plurality of rings (hereinafter, referred to as stationary disks) having a certain height and concentric with the axis of the rotating shaft like the rotary disks are provided on inner surfaces of a front bracket and a rear bracket to face opposite surfaces of the rotary disks and mesh with the rotary disks with a certain air gap. Therefore, when the rotating shaft rotates, the rotor rotates together therewith, and the rotary disks rotate in the same manner. As the rotary disks then rotate keeping some air gaps between them and the stationary disks, they can rotate without coming into contact with the stationary disks. Heat generated by a field coil can be transmitted to the rotor, the rotary disks, the air gaps, the stationary disks, the front bracket, the rear bracket and a cooling water in this order to define a thermal path, so that heat of the field coil is radiated to the cooling water.

A prior technique associated with a cooling means for a stator in a motor for vehicles is disclosed in Japanese Patent Unexamined Publication No. 2000-116062. In this technique, the motor for vehicles consists of a motor, a casing and a housing. A passage, through which a running air flow passes, is formed between the casing and the housing, and a surface of the casing in contact with the stator of the motor is provided with partition plates, radiating fins, turbulent flow producing projections to enhance the efficiency of heat exchange with the running air flow.

The following issues have remained in the above prior art. In order for an alternator for vehicles to develop an adequate output in operation, it is essential to flow a field current adequately. However, when current flows through the field coil, the internal resistance of the field coil causes the field coil itself to generate heat. Once the field coil generates heat to rise in temperature, the internal resistance of the field coil further increases to lead to insufficient field and no acquisition of output. Therefore, cooling of the field coil is essential. Further, in order to restrain degradation, in the performance of a motor for vehicles, caused by temperature rise, it is necessary to efficiently cool the stator coil.

With an arrangement disclosed in Japanese Patent Unexamined Publication No. 11-243658, the cooling performance is dominantly effective between the rotary disks and the stationary disks in the heat radiation path for cooling the field coil. This is because heat is transferred mainly by conduction from the rotary disks to the stationary disks via air gaps having a lower thermal conductivity than that of metal or the like. Therefore, in order to enhance the cooling performance, it is necessary to decrease the gaps between the rotary disks and the stationary disks or to increase heat transfer areas of respective disks. However, in view of accuracy of machining and quality of assembly, the gaps are practically around 1 mm. Therefore, for enhancement of the cooling performance, there is caused a problem that there has been a problem a multiple ring structure capable of being increased in heat transfer area is adopted to be increased in costs of machining, parts and assembly.

Also, with an arrangement disclosed in Japanese Patent Unexamined Publication No. 2000-116062, the rate of heat exchange with a running air flow is enhanced and a stator coil is cooled by providing heat radiating fins, turbulence generating projections and the like on a surface of a casing in contact with the stator. However, a rotor is not enhanced in cooling performance, which rotor is designed to be mounted in a space substantially enclosed by the casing. In the case where this technique is applied to an alternator for vehicles, a stator coil is cooled but a rotor is not fully cooled, resulting in an increase in internal resistance of a field coil to lead to no enforcement of adequate field, so that output cannot be obtained adequately.

BRIEF SUMMARY OF THE INVENTION

An object of the present invention is to provide an alternator for vehicles, capable of enhancing the cooling performance of a field coil to develop an adequate output during power generation even if a gap between a rotor surface and a heat transfer surface, to which heat of a rotor is transferred, is large, and reducing costs of machining, part cost and cost of assembly.

The above-described object can be attained by an alternator for vehicles, which comprises a stator comprising a stator core and a stator coil wound around the stator core; a rotor comprising a rotating shaft, a magnetic pole core fitted onto the rotating shaft, and a field coil for magnetizing the magnetic pole core; a rectifier provided on a bracket, which receives therein the rotor; a voltage regulator for regulating the exciting voltage on the field coil; bearings provided on the bracket to support the rotating shaft; and turbulent flow generating members provided in a space closed by surfaces of the rotor and heat transfer surfaces, to which heat is transferred from the rotor, to generate a turbulent flow.

Also, the alternator for vehicles may be of a liquid-cooled type, in which coolant flow passages are provided on a housing around the stator or on the bracket supporting the rotor through the bearing.

Further, concretely, the turbulent flow generating member comprise one or a plurality of members having recesses or projections. They may be made of a metal such as iron or aluminum, resin or sintered material. These turbulent flow generating members generate turbulence in a flow in the closed space to adequately stir the liquid, so that heat transfer over the surface of the rotor and the heat transfer surface of the bracket is enhanced and passing of heat between them is promoted.

Other features, objects and advantages of the present invention will become apparent from the following description when taken in conjunction with the accompanying drawings.

DETAILED DESCRIPTION OF THE INVENTION

Figure 1:
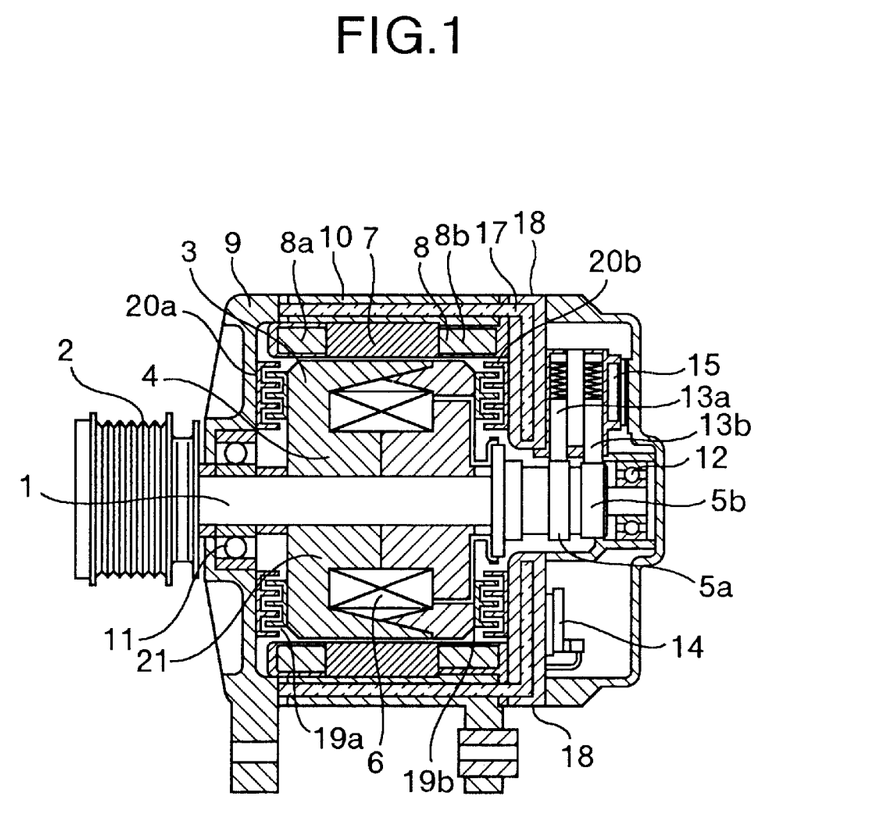
FIG. 1 shows an overall longitudinal, cross sectional view showing an alternator for vehicles, according to an embodiment of the invention.

A preferred embodiment of the present invention will be described below with reference to FIGS. 1 and 2. FIG. 1 shows a longitudinal cross section of a liquid-cooled alternator for vehicles, according to a first embodiment of the invention.

While the invention can use one of various coolants including water, oil and so on, the embodiment described below use an engine cooling water as a coolant. Referring to FIG. 1, fixed to a rotating shaft 1 are a pulley 2, a rotor magnetic pole core 3 (a portion of a pawl surrounding a field coil of the rotor as shown in the figure), a rotor core 4 and slip rings 5a and 5b. In addition, the rotor magnetic pole core 3 and the rotor core 4 are formed from the same material. Around the rotor core 4 is wound a field coil 6. A rotor 21 is composed of the rotor magnetic pole core 3, the rotor core 4 and the field coil 6. The field coil 6 is electrically connected to an external electric power source via the slip rings 5a and 5b. Brushes 13a and 13b are rotatably brought into contact with the slip rings 5a and 5b, respectively.

Around an outer periphery of the rotor 21 is arranged a stator core 7 with a certain air gap therebetween. Around the stator core 7 is wound a stator coil 8 having parts 8a and 8b (hereinafter, referred to as "coil ends") extending beyond the stator core 7.

Around an outer periphery of the stator core 7 is arranged a housing 10, in which are provided cooling water flow passages 17. The stator core 7 is inserted into the housing 10, and the outer periphery of the stator core 7 comes in contact with an inner periphery of the housing 10.

A front bracket 9 and a rear bracket 18 are fitted onto the housing 10, which supports the stator core 7, to support the same. The rotating shaft 1 is rotatably supported by a front bearing 11 provided on the front bracket 9 and a rear bearing 12 provided on the rear bracket 18. Thus the rotor 21 is configured to be disposed in a closed space defined by the front bracket 9, the rear bracket 18 and the housing 10.

The rotor 21 is provided on both axial sides thereof with a plurality of rings 19a and 19b (referred hereinafter to as "rotary disks"), which have a certain height and are concentric with an axis of the rotating shaft 1. Fixed to inner surfaces of the front bracket 9 and the rear bracket 18 opposed to the rotary disks 19a and 19b are a plurality of rings 20a and 20b (referred hereinafter to as "stationary disks"), which have a certain height and are concentric with the axis of the rotating shaft 1 like the rotary disks 19a and 19b, to mesh with the rotary disks 19a and 19b with air gaps (air layers 23) therebetween.

With such arrangement, when the rotating shaft 1 rotates, the rotor 21 rotates integrally therewith and the rotary disks 19a and 19b rotate as well. As the rotary disks 19a and 19b then rotate with some air gaps between them and the stationary disks 20a and 20b, they can do so without coming into contact with the stationary disks 20a and 20b.

Figure 2A:
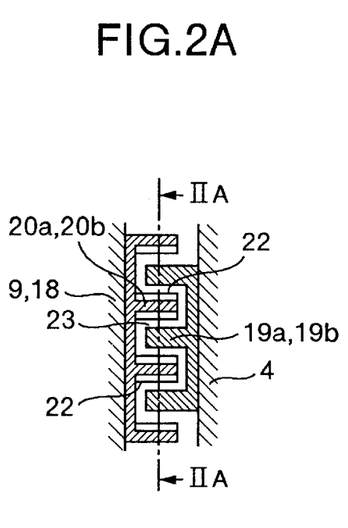
FIG. 2A is an enlarged view showing engaging portions of disks shown in FIG. 1.
Figure 2B:
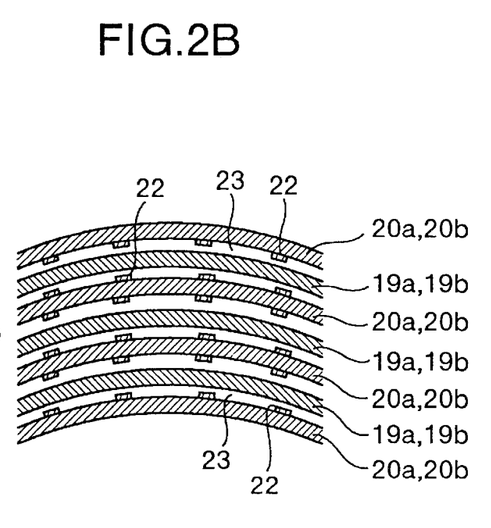
FIG. 2B is a cross sectional view taken along the IIA—IIA in FIG. 2A.

FIG. 2A is an enlarged view showing the rotary disks 19a and 19b and the stationary disks 20a and 20b, and FIG. 2B is a cross sectional view taken along the line IIA—IIA.

Projections 22 are provided on heat transfer surfaces of the stationary disks 20a and 20b facing the rotary disks 19a and 19b. These projections 22 serve as turbulent flow generating members for generating turbulent flows in air flow generated by the rotation of the rotary disks 19a and 19b in spaces defined by the rotary disks 19a and 19b and the stationary disks 20a and 20b. A cooling water flow passage provided in the rear bracket 18 is present between a rectifier 14 and the stationary disk 20b, so that heat generated by the rectifier 14 may not affect the stationary disk 20b. While the turbulent flow generating members are constituted by the projections 22 shown in FIG. 2, recesses may be provided on disk surfaces to replace the projections 22. It is essential that air flows be caused to peel off the disk surfaces and then the peeled air flows be caused to again adhere to the disk surfaces. Other configurations than projections and recesses may serve as long as they can attain the above effect. Materials, which form the turbulent flow generating members, are optional. However, metal is preferable because projections and recesses can serve as cooling portions.

An explanation will be given below to an operation in the present embodiment. When an engine (not shown) starts running, a cooling water is supplied from a vehicle, and the rotating shaft 1 rotates. When a charge of electricity in a battery (not shown) becomes scarce, power generation is started such that an exciting voltage is supplied to the field coil 6 via the brushes 13a and 13b and the slip rings 5a and 5b to excite the rotor magnetic pole core 3. Since a drive force from the engine has been transmitted to the rotating shaft 1 via the pulley 2, the rotor magnetic pole core 3 rotates within the stator coil 8. Then, as magnetic flux traversing the stator coil 8 varies, an induced electromotive force is generated in the stator coil 8. Since current thus generated is A.C. current, it is converted into D.C. current by the rectifier 14 to be supplied to the vehicle.

Depending upon a magnitude of electric load on the vehicle, a voltage regulator 15 operates to adjust the exciting voltage supplied to the field coil 6 to maintain a suitable quantity of power generation. While the field coil 6, stator coil 8, rectifier 14 and the voltage regulator 15 cause heat generation in operation, they must be kept at or below certain temperatures so as to preserve their capacities. In order to adequately achieve output during power generation, a sufficient field current should be made to flow. However, when current is made to pass through the field coil 6, the field coil 6 itself generates heat due to internal resistance thereof. If the field coil 6 generates heat to rise in temperature, the internal resistance of the field coil 6 would further increase to make a magnetic field insufficient to obtain a necessary output, and so it is important to cool the field coil 6.

Therefore, the above-described configuration can define a heat path, along which heat generated by the field coil 6 is transmitted to the rotor 21, the rotary disks 19a and 19b, the air layers 23, the stationary disks 20a and 20b, the front bracket 9, the rear bracket 18 and the cooling water in this order, so that heat in the field coil 6 is discharged to the cooling water. At this time, rotation of the rotary disks 19a and 19b causes convection in the air layers 23 between the stationary disks 20a and 20b and the rotary disks 19a and 19b due to the viscosity of the air, and the provision of the projections 22 on the heat transfer surfaces of the stationary disks 20a and 20b generates turbulence of flow on the downstream of the projections 22 to increase the heat transfer rate. In addition, without these projections 22, air flow would be made laminar, and an air in the vicinity of the disks would rotate at substantially the same speed as the disk surfaces to impede heat transfer. Thus the heat transfer performance from the rotary disks 19a and 19b to the stationary disks 20a and 20b enhances with an increase in the rotational frequency of the rotary disks 19a and 19b, so that the field coil 6 can be cooled further.

Figure 3A:
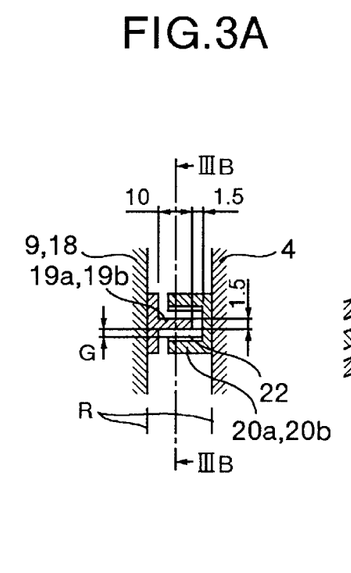
FIG. 3A is an enlarged view showing engaging portions of disks shown in FIG. 1, which are used for calculation of thermal resistance.
Figure 3B:
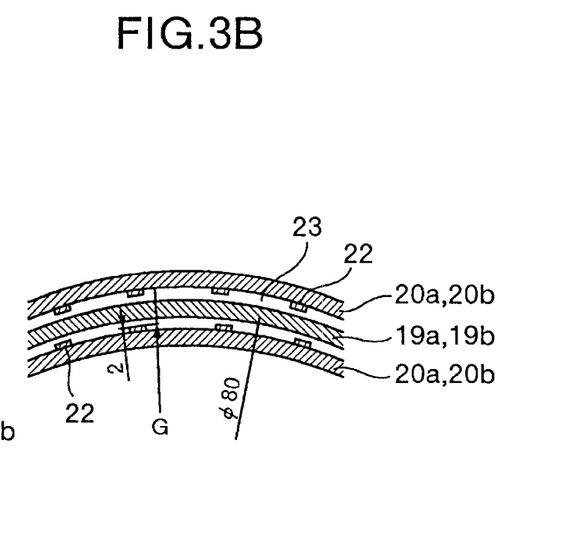
FIG. 3B is a cross sectional view taken along the IIIA—IIIA in FIG. 3A.
Figure 4:
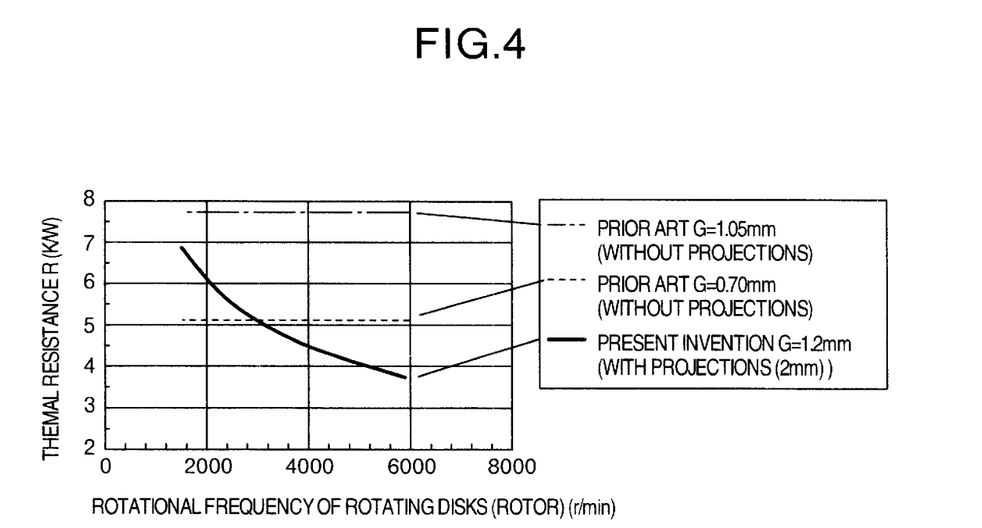
FIG. 4 is a diagram of cooling performance showing indicative of thermal resistance in engaging portions of disks shown in FIG. 1.

Comparison of cooling performance between the case without the projections 22 (the prior arts) and the present embodiment will be described with reference to FIGS. 3A, 3B and FIG. 4. FIG. 3A shows an enlarged view showing a state of engagement between the rotary disks 19a and 19b and the stationary disks 20a and 20b, these disks being provided in one pair and FIG. 3B is a cross sectional view taken along the line IIIB—IIIB in FIG. 3A.

Projections 22 (2 mm in height) are provided on the heat transfer surfaces of the stationary disks 20a and 20b opposed to the rotary disks 19a and 19b. FIG. 4 shows the result of computation of thermal resistance R indicative of the cooling performance between the rotary disks and the stationary disks in the case where the rotary disks 19a and 19b are 80 mm in outer diameter, 1.2 mm in thickness and 10 mm in height and are made of aluminum.

With the conventional arrangement (without the projections 22), heat is transferred from the rotary disks to the stationary disks via the air layers 23 in-between mainly in conduction. Therefore, as shown in FIG. 4, the smaller the gaps G, the smaller the thermal resistance R, and so the thermal resistance varies little even when the rotational frequency of the rotary disks is increased. Also, taking account of the processing accuracy and the quality of assembly, the gaps G would be practically around 1 mm, and in order to reduce the thermal resistance, it would be necessary to adopt a multiple ring structure capable of increasing the heat transfer area, which leads to an increase in costs of processing and parts.

With the arrangement of this embodiment, the provision of the projections 22 on the heat transfer surface of the disks make it possible to generate turbulence even if gaps between the surface of the rotor and those heat transfer surface, to which heat of the rotor is transferred, are large downstream of the projections 22, thus enabling increasing the heat transfer rate. As heat is transferred from the rotary disks to the stationary disks mainly in heat transmission, the thermal resistance R is dependent on the rotational frequency of the rotor irrespective of the magnitude of the gaps G. Therefore, the more the rotational frequency of the rotor is increased in order to obtain an output of the alternator for vehicles, the smaller the thermal resistance R. Therefore, the cooling performance is enhanced to conspicuously distinguish over the prior art.

In addition, it is desired in this embodiment that the projections 22 be 0.5 to 3 mm in height, the rotary disks be 0.5 to 2 mm in thickness and 5 to 20 mm in height, and the gaps G be 0.5 to 3 mm in width. As described above, the projections are provided on the heat transfer surfaces, through which heat is transferred from the rotor toward the brackets, in a space closed by the surface of the rotor and the heat transfer surfaces of the brackets, to which heat is transferred from the rotor, whereby convection is caused by rotation of the rotor to generate in the air layers on the heat transfer surface of the rotor and on the heat transfer surfaces of the brackets, along with which turbulence of flow is caused downstream of the projections to enhance the heat transfer rate with an increase in the rotational frequency of the rotor. Therefore, the surface of the rotor and the heat transfer surfaces of the brackets, to which heat is transferred from the rotor, can be reduced in area, and a gap between the surface of the rotor and the heat transfer surfaces of the brackets, to which heat is transferred from the rotor, can be enlarged. Thereby, reduction in cost of processing, parts and assembly can be achieved. Also, the cooling performance of the field coil is enhanced with an increase in the rotational frequency of the rotor, so that high output and high efficiency can be achieved.

Further, enhancement in the cooling performance of the field coil can be achieved in a space enclosed by closed by the surface of the rotor and the heat transfer surfaces of the brackets, to which heat is transferred from the rotor, that is, in a state, in which the rotor is substantially enclosed by the brackets, the housing and the seals. Therefore, as compared with an air-cooled type alternator for vehicles provided with a fan, it is possible to reduce noise and prevent entry of foreign matter, thus achieving an increased reliability.

Figure 5A:
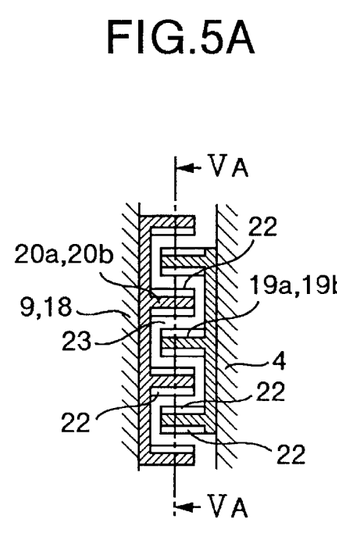
FIG. 5A is an enlarged view showing another example of engaging portions of disks shown in FIG. 1 and similar to FIG. 2A.
Figure 5B:
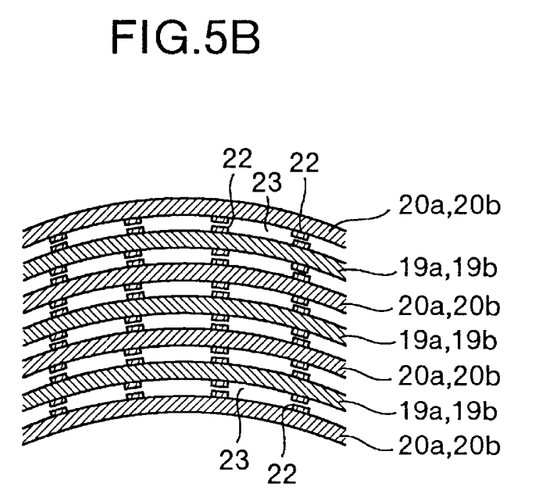
FIG. 5B is a cross sectional view taken along the VA—VA in FIG. 2A.

FIGS. 5A and 5B depicts another example of engagement of disks as shown in FIG. 1 and is a view similar to FIGS. 2A and 2B. The arrangement shown in FIGS. 5A and 5B is different from that shown in FIGS. 2A and 2B in that projections (turbulent flow generating members) 22 are provided on heat transfer surfaces of both rotary disks 19a and 19b and stationary disks 20a and 20b opposed thereto. With such arrangement, rotation of the rotary disks 19a and 19b causes convection in air layers 23 between the stationary disks 20a and 20b and the rotary disks 19a and 19b due to the viscosity of the air, and generates turbulence of flow on the downstream of the projections 22 to increase the heat transfer rate of both transfer surfaces of both rotary disks and stationary disks. Therefore, the heat transfer performance from the rotary disks 19a and 19b to the stationary disks 20a and 20b is further enhanced. With such arrangement, the same cooling effect as that in the first embodiment is obtained and additional labor is entailed in formation of the projections as compared with the first embodiment but the cooling effect is believed to be increased.

Figure 6A:
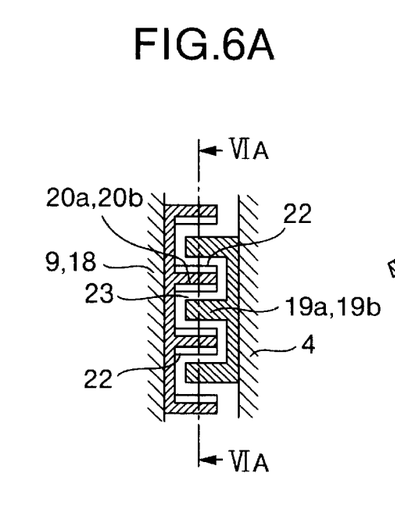
FIG. 6A is an enlarged view showing a further example of engaging portions of disks shown in FIG. 1 and similar to FIG. 2A.
Figure 6B:
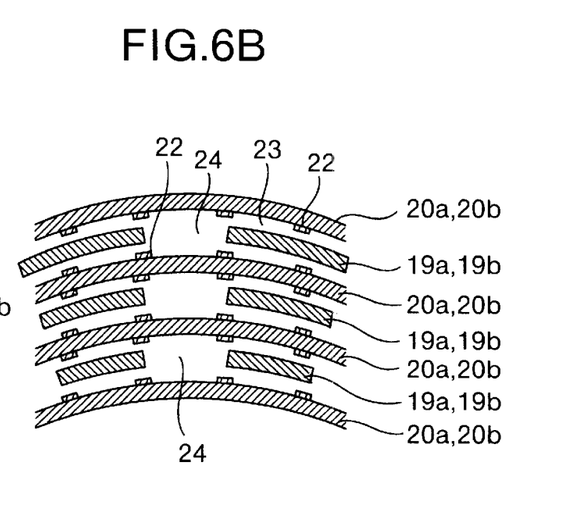
FIG. 6B is a cross sectional view taken along the VIA—VIA in FIG. 6A.

FIGS. 6A and 6B depicts a further example of engagement of disks as shown in FIG. 1 and is a view similar to FIGS. 2A and 2B. The arrangement shown in FIGS. 6A and 6B is different from that shown in FIGS. 2A and 2B and 5A and 5B in that circumferences of rotary disks 19a and 19b are partly cut out to provide notches 24. With such arrangement, in addition to turbulence generated by the projections 22 provided on the stationary disks 20a and 20b, turbulence is promoted in air flows trailing the notches 24 to cause an increase in the heat transfer rate, so that the cooling effect on the rotor 21 is enhanced as compared with that in the first embodiment.

Figure 7:
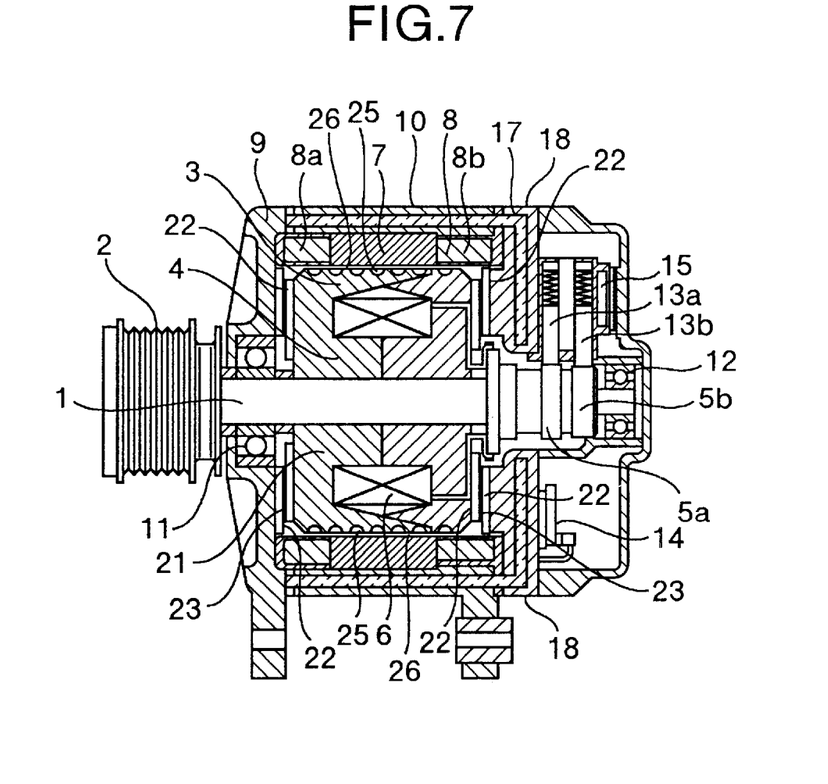
FIG. 7 shows an overall longitudinal, cross sectional view showing an alternator for vehicles, according to another embodiment of the invention.
Figure 8:
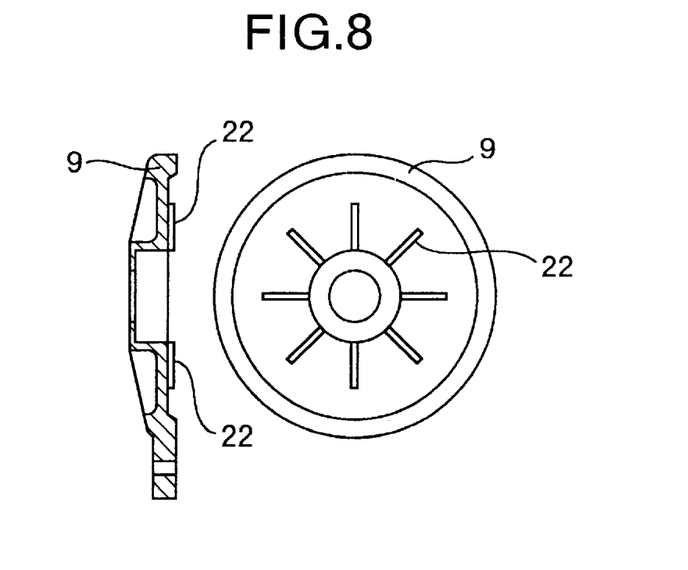
FIG. 8 is a cross sectional view and a side view illustrating a construction of a front bracket in the embodiment shown in FIG. 7.
Figure 9:
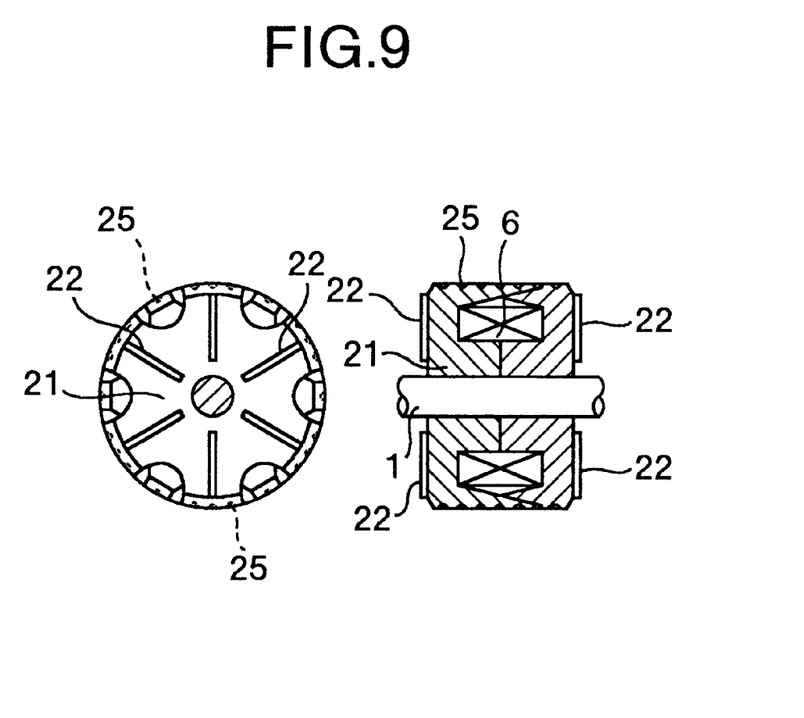
FIG. 9 is a cross sectional view and a side view illustrating a construction of a rotor in the embodiment shown in FIG. 7.

A further embodiment of the present invention will be described with reference to FIGS. 7 to 9. FIG. 7 shows a longitudinal cross section of a liquid-cooled alternator for vehicles, like FIG. 1, in which the first embodiment is shown. This embodiment is different from the first embodiment in that instead of providing the rotary disks 19a and 19b and the stationary disks 20a and 20b, a plurality of vanes (projections or turbulent flow generating members) 22 are provided on both end surfaces of a rotor 21 in such a direction as to intercept air flows generated in a rotating direction, as shown in FIGS. 8 and 9, and vanes (projections or turbulent flow generating) 22 are also provided on a front bracket 9 and a rear bracket 18, which face the end surfaces of the rotor. While such projections are provided at an angle substantially perpendicular to a rotating direction in this embodiment, such angle may be one, at which air flows generated upon rotation can be intercepted and turbulence can be generated on a downstream side of the vanes (projections) 22. Further, recesses 25 are also provided on a surface of a rotor magnetic pole core 3 in this embodiment to generate turbulence downstream thereof, thereby enhancing the cooling efficiency.

With such arrangement, rotation of the rotor 21 causes convection in air layers 23 between side surfaces of the rotor 21 and brackets 9, 18 and in an air layer 26 between the rotor magnetic pole core 3 and the stator core 7 due to the viscosity of the air, and generates turbulence on downstream sides of the projections 22 and the recesses 25, respectively, so that the heat transfer rate increases on the side surfaces of the rotor 21, heat transfer surfaces of the brackets 9 and 18, a surface of the rotor magnetic pole core 3 and a heat transfer surface of the stator core 7 to thereby enable enhancing the heat transfer performance from the side surfaces of the rotor 21 to the brackets 9, 18 and that from the surface of the rotor magnetic pole core 3 to the stator core 7. Thereby, the rotor is enhanced in cooling efficiency as compared with the embodiment shown in FIG. 1 and the rotor 21 can be made compact in an axial length because there are not provided any rotary disks and stationary disks.

In addition, in the above embodiments, the housing 10 and the front bracket 9 may be formed integral with each other. Also, the housing 10 and the rear bracket 18 may be formed integral with each other. Also, the front bracket and the stationary disk 20a may be formed integral with each other, and the rear bracket 18 and the stationary disk 20b may be formed integral with each other. Also, the rotor 21 and the rotary disks 19a and 19b may be formed integral with each other. When the front bracket 9 is separate from the stationary disk 20a and the rear bracket 18 is separate from the stationary disk 20b, the stationary disks 20a and 20b may be formed of metal, such as iron or aluminum, sintered metal or resin. Further, when the front bracket 9 is formed integral with the stationary disk 20a and the rear bracket 18 is formed integral with the stationary disk 20b, they may be integrally formed by aluminum die casting.

The cooling water flow passages 17 may be arranged within the front bracket 9 or the rear bracket 18. In place of the projections 22, recesses may be provided on the heat transfer surfaces. The rotary disks, stationary disks and projections may be provided on one side of the rotor 21. In addition, the combination of projections on the rotary disks, stationary disks and the heat transfer surfaces may also be applied to air-cooled or combined air-cooled and liquid-cooled alternators for vehicles and to brushless alternators for vehicles.

As described above, in an alternator for vehicles according to the invention, a surface of the rotor and heat transfer surfaces of the brackets, to which the heat of the rotor is transferred, are arranged in a closed space and further turbulent flow generating members are provided, whereby the heat transfer rate is enhanced with the rotational frequency of the rotor. Therefore, it becomes possible to reduce a heat transfer surface on the side of the rotor and surfaces, to which heat of the rotor is transferred, in area and to enlarge gaps between the heat transfer surface on the side of the rotor and those surfaces, to which heat of the rotor is transferred. Thereby, it is possible to achieve reduction in processing cost, part cost and cost of assembly. Also, the cooling performance of the field coil is improved with the rotational frequency of the rotor, so that it is possible to achieve high output and high efficiency.

What is claimed is:

1. An alternator for a vehicle, comprising:
   a stator including a stator core and a stator coil wound around the stator core;
   a rotor including a magnetic pole core and a field coil for magnetizing the magnetic pole core;
   a rotary disk rotationally connected to the rotor and including rotary disk fins each projecting axially and extending in a circumferential direction; and
   a stationary disk axially facing to the rotary disk and including stationary disk fins each projecting axially and extending in the circumferential direction in such a manner that one of the rotary disk fins and one of the stationary disk fins which are radially adjacent to each other face radially to each other to form a space extending in the circumferential direction; and
   wherein one of the one of the rotary disk fins and the one of the stationary disk fins which are radially adjacent to each other and face radially to each other to form the space has projections projecting radially in the space toward another one of the one of the rotary disk fins and the one of the stationary disk fins, and the projections have a longitudinal direction which is parallel to a rotational axis of the rotor.

2. An alternator according to claim 1, wherein the rotary disk further includes a disk-shaped radially extending rotary disk body from which the rotary disk fins project axially, the stationary disk further includes a disk-shaped radially extending stationary disk body from which the stationary disk fins project axially, and a longitudinal end of each of the projections joins one of the rotary disk body and the stationary disk body from which the one of the one of the rotary disk fins and the one of the stationary disk fins which project axially and which have the projection projecting therefrom.

* * * * *